3,578,488
METHOD FOR RENDERING SUBSTRATES WATER REPELLANT

Howard Gary Ohlhausen, 82 Graymoor Lane,
Olympia Fields, Ill. 60461
No Drawing. Filed June 21, 1968, Ser. No. 738,787
Int. Cl. C09d 3/48
U.S. Cl. 117—123                                 16 Claims

ABSTRACT OF THE DISCLOSURE

A method for rendering substrates water repellant by treating the same with a composition containing a poly alkyl vinyl ether/maleic anhydride having the following formula:

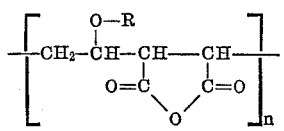

wherein R is an alkyl radical having sufficient number of carbon atoms to render the polymer water insoluble, and $n$ is an integer greater than 1. The polymer is preferably present in the composition in an amount 0.5–40% by weight. Other water repellant compounds or additives are advantageously included in the composition.

BACKGROUND OF THE INVENTION

This invention relates to a method of treating substrates and more particularly to a method of treating substrates to render them water repellant.

There are a wide variety of industrial and private work operations where it is desired to treat a substrate to render the same water repellant. Examples of such operations are the treatment of concrete, textiles, paper objects, wood objects, metal, ceramics, and masonry surfaces such as the exterior of buildings. Such surfaces are adversely affected, progressively degraded and ultimately deteriorated by exposure to water. Repeated wetting, water penetration and absorption, freezing and thawing causes and results in erosion and scaling, spalling and cracking, peeling and flaking, efflorescence and crusting, soiling and staining, warping and splitting, and corrosion. Such damage can be substantially prevented by properly treating the substrates to render same water repellent in accordance with the process and compositions of this invention.

Heretofore, it has been necessary to prepare a special and individual composition for treating a particular type of surface to render the same water repellant. Thus, for example, in the treatment of exterior surfaces of buildings, a different composition is normally used for treating the concrete, bricks or other masonry surfaces than is used for treating wood or metal surfaces which may be a part of the exterior of such buildings. This is largely due to the fact that different water repellant compositions will have different degrees of effectiveness on different surfaces to be treated. Up to now, no universal water repellant composition is known which can be used on such diverse surfaces as masonry, wood, paper, textiles, glass, etc.

With respect to the water repellant compositions employed in the building and the construction field, the known compositions usually require several days to several weeks at the ambient temperature to cure or dry. An example of such prior art composition is the methyl silicone resins disclosed in Brick U.S. Pat. 2,574,168. Such prior art silicone compounds have relatively good water repellant properties but they usually require several days to cure or dry at ambient air temperature. If such prior art silicone compounds are applied to a wet surface, or if they are wetted shortly after they are applied to a dry surface, they tend to be relatively ineffective to render the coated surface water repellant. It is due to this relatively long curing or drying time requirement that silicone water repellant compositions have been limited in their usage. Particularly in areas where there is a wet or rainy season, such silicone compositions are often not employed at all.

It is, accordingly, an object of the present invention to provide a novel water repellant composition which can be applied to a great variety of substrates to render the same water repellant.

A further object of the invention is to provide an improved water repellant composition which is quick acting in providing water repellancy.

Another object of the present invention is to provide an improved method for rendering substrates water repellant.

Other objects and advantages of the invention can be gathered from a reading of the following disclosure.

DESCRIPTION OF PREFERRED EMBODIMENTS

In accordance with the present invention, I provide a method for rendering various substrates water repellant by applying thereto a composition comprising a poly alkyl vinyl ether/maleic anhydride having the following repeating structural units:

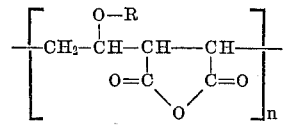

wherein R is an alkyl radical having sufficient number of carbon atoms therein to render the polymer water insoluble, and $n$ is an integer greater than 1.

The poly alkyl vinyl ether/maleic anhydride used in the process of the present invention may be employed alone in a solution form or it may be mixed with other water repellant compounds. It is soluble in aromatic, aliphatic and halogenated hydrocarbons. Although the material may be used in any concentration to obtain a water repellant effect on the substrate, I have found that it is extremely desirable to use the material in a concentration between about 0.5 to 40% by weight of the solution. Although some water repellant effect can be obtained by using a solution containing less than 0.5% of the poly alkyl vinyl ether/maleic anhydride, I have found that for most practical purposes a solution containing at least 0.5% of the poly alkyl vinyl ether/maleic anhydride should be used. Solutions containing more than 40% by weight of the polymer give excellent results when applied to a substrate but they are relatively difficult to work with because of the high viscosity. In addition, it may not be economical to use a highly concentrated solution of the polymer.

Preferably, the coating composition to be used in the process of the present invention contains about 5–20% of the polymer. More particularly, I have found that a solution containing about 5% of the polymer is very effective and economical to use.

As indicated above, the polymer is readily soluble in aromatic, aliphatic and halogenated hydrocarbons. Examples of such solvents are toluene, mineral spirits, and trichloroethylene. The polymer is compatible with non-polar compounds and substrates. When the polymer is used to coat a polar substrate, adhesion can be improved by hydrolyzing the polymer to its free acid form.

The poly alkyl vinyl ether/maleic anhydride employed in the process of the invention can be mixed with other water repellant materials. Examples of such other water repellant materials are silicones. Such water repellant silicones are commericially available under the trade names Dow Corning 772 Water Repellant, Union Carbide R-27 Silicone Water Repellant, General Electric Dri-Film 144 Water Repellant, etc. These silicones may be advantageously added in an amount from about 0.5 to 15% by weight of the final mixture. Other additives which may be used with the polymer include waxes, tertiary fatty amines, metallic soaps, etc. or a mixture of these materials. These materials may also be added in a concentration from about 0.5 to 15%.

The poly alkyl vinyl ether/maleic anhydride polymer which is suitable for use in the process of the invention contains an alkyl radical having a sufficient number of carbon atoms therein to render the polymer water insoluble. Preferably, I have found that the alkyl radicals in the polymer should contain about 12-24 carbon atoms each. Thus, a vinyl ether/maleic anhydride polymer containing a relatively large alkyl radical, such as an octadecyl radical, is water insoluble but is soluble in aliphatic, aromatic and halogenated hydrocarbons. On the other hand, it has been found that poly (methyl vinyl ether/ maleic anhydride) is soluble in water and some solvents such as alcohols, aldehydes, ketones, etc., but insoluble in aliphatic, aromatic or halogenated hydrocarbons.

As the poly alkyl vinyl ether/maleic anhydride polymer, I prefer to use a poly (octadecyl vinyl ether/maleic anhydride). One such polymer is available from the General Aniline and Film Corporation under its trade name Gantrez AN-8194. This material is available in a concentration of about 40% solids dissolved in toluene. It has a viscosity at 74° F. of approximately 150 cps. It has a molecular weight in the range of about 20,000 to 30,000, which corresponds to a value of $n$ of about 50 to 77. When this material is used as the polymer in the present process, it may be diluted to any desired concentration by the addition of a proper amount of a solvent or diluent, such as toluene, mineral spirits or xylene.

The water repellant treating composition of the present invention, containing the poly alkyl vinyl ether/maleic anhydride, is extremely quick acting and becomes effective in a much shorter period of time when compared to the prior art water repellant compounds. Thus, a coating of a 5-20% solution of the polymer can be air cured or dried in less than one hour at ambient temperature. This is in contrast to the several days curing or drying time normally required of the silicone resins used for the same purposes. Moreover, the composition of the present invention, with or without the addition of other water repellant compounds or additives, can be applied onto a wet masonry surface and still impart water repellancy to the coated surface. If the present composition is coated on the exterior surfaces of a building and then a sudden rainstorm falls in the area, the coated surface will nevertheless be rendered water repellant. This is in distinct contrast to the silicone resins which, when applied to a surface, must be completely dried before it will form an adherent water repellant coating thereon. If a silicone covered masonry surface is exposed to rain or other moisture within a few hours after its application, the portions of the coated surface which came into contact with the moisture will be rendered considerably less effective, if not totally ineffective as a water repellant. From the above, it can be seen that the conventional water repellant compositions cannot be safely employed when the weather is uncertain or when precipitation is expected, whereas the present composition can be applied practically at any time.

The water repellant composition of the invention can be used to treat any substrate. It is adherent to and effective on such diverse types of surfaces as concrete, mortar, brick, stucco, tile, wood, ceramic, metal, plastic, glass, textiles, leather, paper, etc. Moreover, the composition of the invention is effective on painted as well as unpainted substrates. It has also been found that, if desired, paint can be applied over, and will adhere to, a substrate previously treated in accordance with the process of the invention.

As mentioned above, the poly alkyl vinyl ether/maleic anhydride may be used in the process of the present invention either alone or mixed with other additives such as silicone, waxes, tertiary fatty amines, alloyed resins, etc. Moreover, it is sometimes desirable to use a mixture of the poly alkyl vinyl ether/maleic anhydride with other treating materials to obtain a desired result. Thus, for example, dyes, pigments, stains or other materials including fillers may be incorporated in the polymeric composition of the invention to visually modify the treated substrate. Examples of other materials which can be advantageously employed by mixing with the polymeric composition of the invention include fungicides, bactericides, and fire-retardant materials. The use of a mixture of the poly alkyl vinyl ether/maleic anhydride and bactericides, for example, will be beneficial since the polymeric composition will tend to keep the treated substrate dry thus depriving any bacteria which may be present of favorable growth environment.

It should be noted that the process of the invention can be used to keep moisture within a substrate as well as without. For example, in the curing of concrete or mortar, it is important to keep moisture in the structure for the proper development of strength of the materials. The moisture can be retained in concrete or mortar by treating the surface of the structure in accordance with the present invention.

The poly alkyl vinyl ether/maleic anhydride employed in the present invention forms an adherent coating on such difficultly coatable surfaces as glass and metal objects. For this reason, the method of the present invention may be used to protect equipment or structures in the construction field. For example, in the construction of a large building, the lower portions of the building, and the equipment installed thereat such as pumps and plumbing equipment or parts of an elevator are frequently either immersed in water or exposed to very high humidity. Such exposure frequently causes the structure or equipment to rust and deteriorate. Moreover, in the case of electrical equipment, prolonged exposure to moisture may cause the equipment to be inoperative or be the source of electrical fire hazards. In such situations, a heavy grease is sometimes used to protect the equipment from the moisture, but this is not very satisfactory. The grease may be rubbed off or it may be washed off of equipment. As a result, when such equipment is being protected by a film of heavy grease, the protective film must be periodically inspected and renewed. I have found that protection of such equipment from exposure to high levels of moisture can be more effectively rendered by the method and composition of the present invention. Thus, a solution of a poly alkyl vinyl ether/maleic anhydride, with or without other additives such as a silicone resin, can provide an adherent and water repellant coating on metallic or other surfaces of equipment or structures to protect the same against exposure to moisture.

Another useful application of the method and composition of the invention resides in the protection of various products during storage and shipment against corrosion by moisture. Thus, many metallic products are frequently corroded during this period between the manufacture and the delivery to a user. Such corrosion can now be prevented by the use of the method and composition in accordance with the present invention.

The invention will be further illustrated by the following examples which show various preferred embodiments.

In the following examples, the water repellancy of a poly(octadecyl vinyl ether/maleic anhydride), hereinafter referred to as POVE-MA, is compared with a typical silicone water repellant composition (hereinafter referred to as TSWR). The POVE-MA employed in these examples was obtained from the General Aniline and Film Corporation under its trade name Gantrez AN-8194, which was 40% by weight of the polymer solids in toluene solvent. This material was diluted with mineral spirits to the concentrations desired. The TSWR employed was the R-27 silicone water repellant composition obtained from the Union Carbide Corporation, which was at 33% silicone solids solution in petroleum solvent. This material was also diluted with mineral spirits to the concentrations indicated. In the examples where a mixture of a POVE–MA and TSWR are employed, the total solids concentration indicates the combined solids content of the two materials. Thus, where the treating composition contains POVE–MA/TSWR at a 1:1 ratio, and the total solids concentration being 5%, the active ingredients are present in the amount of 2.5% each.

EXAMPLE I

Common hous bricks were cleaned to remove surface dust and loose chips. These bricks were then coated on all surfaces with the solutions indicated below. Two sets of bricks were so coated and one set was allowed to air dry after the solution was applied onto the bricks at ambient temperature for 10 minutes, while the other set was allowed to dry in ambient air for a period of 24 hours. At the end of the drying periods, the bricks were weighed and then completely immersed in a container of water for a period of 15 minutes. After the immersion, the bricks were removed from the water container, blotted to remove excess water adsorbed on the surfaces of the bricks, and re-weighed to determine the amount of water absorbed. The amount of solution applied was about 125 ft.$^2$ of surface area covered per gallon of treating composition.

TREATED BRICKS DRIED FOR TEN MINUTES IN AMBIENT AIR

| Treating compositions | Total solids concentration, percent | Percent weight increase due to water picked up |
|---|---|---|
| POVE-MA | 5 | 6.31 |
| POVE-MA | 20 | 4.87 |
| TSWR | 5 | 12.86 |
| TSWR | 20 | 8.24 |
| POVE-MA/TSWR (1:1 ratio) | 5 | 4.92 |
| Do | 10 | 3.14 |
| Control (untreated) | | 18.15 |

TREATED BRICKS DRIED FOR 24 HOURS IN AMBIENT AIR

| Treating compositions | Total solids concentration, percent | Percent weight increase due to water picked up |
|---|---|---|
| POVE-MA | 5 | 0.62 |
| POVE-MA | 20 | 0.51 |
| TSWR | 5 | 1.88 |
| TSWR | 20 | 1.58 |
| POVE-MA/TSWR (1:1 ratio) | 5 | 0.41 |
| Do | 10 | 0.27 |
| Control (untreated) | | 20.35 |

The TSWR silicone water repellant composition employed in the above example is typical of the presently available silicone resin compositions which are recommended for treating masonry surfaces. As can be seen from the above tables, the silicone composition is not as effective as the polymer composition of the present composition when both are used at the same concentration and dried for the same period of time. Moreover, a 5% solution of the polymer of the present invention provided better water repellancy than a 20% solution of the silicone composition under the same conditions.

It should be noted than when a mixture of the polymer and the silicone compositions were employed, the results indicate synergistic activity between the two ingredients since a solution containing only 2½% of each of the ingredients is more effective than a solution containing 5% of *either* of the ingredients.

EXAMPLE II

Wooden panels of pine and oak were provided and cleaned of loose splinters. The wood pieces were then uniformly coated with solutions of various materials indicated below. The solutions were applied by brushing onto all surfaces of the wood pieces. The pine pieces were treated with an amount of composition equivalent to covering 175 ft.$^2$ of surface area per gallon of composition and the oak pieces were treated at a rate of 225 ft.$^2$ per gallon. The treated pieces were allowed to air dry at ambient temperature for a period of 14 days. After the drying period, the wood pieces were weighed and then immersed in a container of water for a period of 15 minutes. Following the immersion period, the wood pieces were removed from the water, blotted, weighed to determine percentages of weight increase due to water absorption. After the weigh-in, the wood pieces were again immersed in water for a period of 16 hours. After the 16 hour immersion period, the wood pieces were again removed, blotted, and re-weighed to determine the amount of water absorbed.

AFTER 15 MINUTES IMMERSION IN WATER

| Treating composition | Total solids concentration, percent | Percent weight increase | |
|---|---|---|---|
| | | Pine | Oak |
| POVE-MA/TSWR (1:1 ratio) | 5 | 2.16 | 1.27 |
| POVE-MA | 5 | 3.65 | 1.35 |
| TSWR | 5 | 5.75 | 3.35 |
| Control (untreated) | | 8.80 | 4.89 |

AFTER 16 HOURS IMMERSION IN WATER

| Treating composition | Total solids concentration, percent | Percent weight increase | |
|---|---|---|---|
| | | Pine | Oak |
| POVE-MA/TSWR (1:1 ratio) | 5 | 9.42 | 7.74 |
| POVE-MA | 5 | 5.84 | 8.05 |
| TSWR | 5 | 23.20 | 16.10 |
| Control (untreated) | | 27.20 | 16.30 |

It will be noted from the above tables that the particular silicone water repellant composition employed is not effective on a wood surface. This points up the fact that prior art water repellant compositions must be specially formulated for a particular purpose and they are not universally effective on different substrates commonly encountered. This is in distinct contrast to the compositions of the present invention. Moreover, when a silicone composition is used with the POVE–MA, the silicone composition appears to have increased in effectiveness since a 5% solution of such a mixture has about the same effectiveness as a 5% solution of POVE–MA. Thus, again the presence of POVE–MA increased the effectiveness of the silicone composition.

EXAMPLE III

Example II was substantially repeated but using construction grade wood beams 2 inches by 4 inches in size. The amount of solution applied to the wood was at a rate of 175 sq. ft. per gallon of solution.

AFTER 15 MINUTES IMMERSION IN WATER

| Treating compositions | Total solids concentration, percent | Percent weight increase due to water picked up |
|---|---|---|
| POVE-MA/TSWR (1:1 ratio) | 5 | 2.78 |
| TSWR | 5 | 8.01 |
| POVE-MA | 3 | 2.61 |
| POVE-MA | 5 | 1.94 |
| POVE-MA | 15 | 1.87 |
| Control (untreated) | | 16.52 |

AFTER FOUR HOURS IMMERSION IN WATER

| Treating compositions | Total solids concentration, percent | Percent weight increase due to water picked up |
|---|---|---|
| POVE-MA/TSWR (1:1 ratio) | 5 | 8.36 |
| TSWR | 5 | 18.72 |
| POVE-MA | 3 | 6.78 |
| POVE-MA | 5 | 3.82 |
| POVE-MA | 15 | 4.90 |
| Control (untreated) | | 32.24 |

It may be noted that the TSWR imparts a slight water repellancy to the beams but such an effect is small when compared to the POVE-MA.

EXAMPLE IV

A sheet of white cotton material was cut into swatches which were immersed in the various solutions indicated below. After the swatches were removed from the treating solutions, and after the excess solutions were removed by blotting, the weight of the samples increased by about 100% each, indicating that the cotton sheeting material picked up an amount of solution equal to its own weight. The treated swatches were then dried in ambient air for a period of 16 hours. Following the drying period, the swatches were uniformly stretched in embroidery hoops. The stretched swatches were divided into two sets. In one set, about 1 cc. of water was measured from a syringe and dropped onto each of the stretched swatches. It was noted that the initial diameter of the water was about ⅝ inch. Thereafter, the wetting characteristics of the substrate were noted in terms of the spreading of the bead of water (diameter of the spread) and the time required for the bead to spread, and the time required to either completely wet or pass through the cotton sheet material. In the other set of treated swatches, water was applied by spraying 1 cc. of water onto the treated surface from a distance of 4 inches at a nozzle pressure of approximately 15 pounds per square inch.

1 CC. OF WATER FROM SYRINGE

| Treating composition | Total solids concentration, percent | Size of bead inches | Elapsed time | Time for complete wetting |
|---|---|---|---|---|
| TSWR | 5 | 2 | 15 seconds | 10 seconds. |
| POVE-MA | 3 | ⅝ | 4 hours | None after 4 hours. |
| POVE-MA | 5 | ⅝ | do | Do. |
| POVE-MA/TSWR (1:1 ratio) | 5 | ⅝ | do | 2½ hours. |
| Do | 10 | ⅝ | do | None after 4 hours. |
| Control (untreated) | | 2½ | 15 seconds | 1 second. |

1 CC. OF WATER SPRAYED

| Treating composition | Total solids concentration, percent | Time for complete wetting | Time for pass through |
|---|---|---|---|
| TSWR | 5 | 2 seconds | 20 minutes. |
| POVE-MA | 3 | None after 4 hours | None after 4 hours. |
| POVE-MA | 5 | do | Do. |
| POVE-MA/TSWR (1:1 ratio) | 5 | 5 minutes | Do. |
| Do | 10 | 2½ hours | Do. |
| Control (untreated) | | 1 second | 2 seconds. |

EXAMPLE V

Corrugated paper carton stock was divided into test panels which were uniformly roller-coated with various solutions as indicated below. Each panel was coated with an amount of solution equivalent to covering about 200 sq. ft. of surface area per gallon of solution. The panels were allowed to air dry in ambient air for a period of five minutes. Following the drying period, a pool of 1 cc. of water was formed on each of the panels. The size of the pool of water was then measured periodically and the percentage increase in the diameter after the elapse of a given period of time was recorded. In addition, the time required for complete wetting and that for complete penetration were also noted.

TREATED PAPER CARTON PANELS DRIED IN THE AIR FOR FIVE MINUTES

| Treating composition | Total solids concentration, percent | Percent increase in diameter, time | Wetting time | Time for complete penetration |
|---|---|---|---|---|
| POVE-MA | 0.5 | 10%, 30 minutes | None/1.5 hours | None/3 hours. |
| POVE-MA | 3 | 6%, 30 minutes | do | Do. |
| POVE-MA | 5 | None, 30 minutes | do | Do. |
| POVE-MA | 15 | do | do | Do. |
| POVE-MA/TSWR (2½%:2½%) | 5 | 50%, 12 minutes | 0.5 hour | Do. |
| POVE-MA/TSWR (5%:3%) | 8 | 2%, 30 minutes | 1 hour | Do. |
| POVE-MA/TSWR (5%:5%) | 10 | None, 30 minutes | None/3 hours | Do. |
| POVE-MA/TSWR (5%:15%) | 20 | do | do | Do. |
| TSWR | 5 | 120%, 3 minutes | 1 minute | 5 minutes. |
| Control (untreated) | | 10%, 30 minutes | 15 minutes | 1 hour. |

Another paper carton panel was treated with a 5% solution of TSWR and allowed to dry in air for 2 hrs. Thereafter, the tests continued as indicated above. It was found that the size of the water pool increased 100% in 5 minutes and the time it took for complete wetting of this sample was 1 minute and the time for complete penetration of the sample was 15 minutes.

From the above, it can be seen that the silicone composition used was not effective on the paper carton stock treated. In fact, the presence of the silicone composition in the POVE-MA may be slightly detrimental as can be gathered from a comparison from the third and the sixth sample in the above tables.

From the foregoing examples, it can be seen that the present invention provides for a method and composition to render various substrates water repellant. It may be noted that the present invention is effective on a variety of substrates which are commonly desired to be rendered water repellant, whereas the compositions of the prior art are only effective on a particular substrate for which the composition was formulated. Thus, the present invention is particularly advantageous for the small user or for users having a variety of substrates to be treated.

The invention has been described in detail with particular reference to preferred embodiments thereof, but it will be understood that variations and modifications can be effected within the spirit and scope of the invention as described hereinabove and as defined in the appended claims.

What is claimed is:

1. A process for rendering a substrate water repellant comprising treating said substrate with a composition consisting essentially of:

(1) a compound having the formula

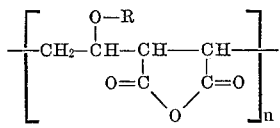

wherein $n$ is an integer greater than 1, and R is an alkyl radical having sufficient number of carbon atoms to render said compound water insoluble, (2) a water repellant silicone, and
(3) a hydrocarbon solvent, said compound is present in said composition in an amount of from about 0.5 to about 40% by weight.

2. A process according to claim 1 wherein R is an alkyl radical having about 12-24 carbon atoms.

3. A process according to claim 1 wherein R is an octadecyl radical.

4. A process according to claim 2 wherein said compound is present in said composition in an amount about 5% by weight.

5. A process according to claim 2 wherein said silicone is present in said composition in an amount from about 0.5–15% by weight, and wherein said solvent is selected from aromatic, aliphatic, and halogenated hydrocarbons, and $n$ has a value of from about 50 to 77.

6. A process according to claim 5 wherein said silicone is present in said composition in an amount of up to about 5% by weight, wherein said compound is poly (octadecyl vinyl ether/maleic anhydride) present in said composition in an amount of up to about 5% by weight, and said solvent is selected from toluene, mineral spirits, and trichloroethylene.

7. A process according to claim 4 wherein said substrate is a concrete or masonry surface.

8. A process according to claim 6 wherein said substrate is a concrete or masonry surface.

9. A composition of matter for rendering a substrate water repellant comprising a solution consisting essentially of (1) a compound having the formula:

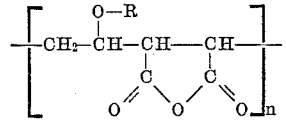

wherein $n$ is an integer greater than 1, and R is an alkyl radical having sufficient number of carbon atoms to render said compound water insoluble, (2) a silicone water repellant-film forming material, and (3) a hydrocarbon solvent, said compound is present in said solution in an amount of from about 0.5 to about 40% by weight.

10. A composition according to claim 9 wherein R is an alkyl radical having about 12–24 carbon atoms.

11. A composition according to claim 10 wherein said compound is a poly (octadecyl vinyl ether/maleic anhydride).

12. A composition according to claim 9 wherein said silicone is present in an amount from about 0.5 to about 15% by weight, said solvent is selected from aromatic, aliphatic and halogenated hydrocarbons, and $n$ has a value of from about 50 to 77.

13. A composition according to claim 11 wherein said poly (octadecyl vinyl ether/maleic anhydride) is present in an amount from about 0.5 to about 40% by weight and said silicone is present in an amount from about 0.5 to about 15% by weight.

14. A composition according to claim 11 wherein said poly (octadecyl vinyl ether/maleic anhydride) is present in an amount of up to about 5% by weight and said silicone is present in an amount of up to about 5% by weight, and said solvent is selected from toluene, mineral spirits, and trichloroethylene.

15. A composition according to claim 1 wherein said compound is present in said composition in free acid form.

16. A solution according to claim 9 wherein said compound is present in said solution in free acid form.

References Cited

UNITED STATES PATENTS 3,442,698   5/1969   Dill et al. _____ 260—78.5

OTHER REFERENCES

Rochow, Eugene G.; An Introduction to the Chemistry of the Silicones, John Wiley & Sons, Inc., New York, 1947; Chapter 5—page 87, para. 3.

ALFRED L. LEAVITT, Primary Examiner

W. F. CYRON, Assistant Examiner

U.S. Cl. X.R.

117—124, 132, 135.1, 138.8, 142.14, 148, 155, 161; 260—33.6, 78.5, 80.71, 824